(12) United States Patent
Borbath et al.

(10) Patent No.: US 6,331,820 B1
(45) Date of Patent: Dec. 18, 2001

(54) EXPLOSION PROOF WATER FLOW DETECTOR

(75) Inventors: Zoltan Borbath, Elmhurst; Scott E. Robillard, Aurora, both of IL (US)

(73) Assignee: Pittway Corporation, Chicago, IL (US)

( * ) Notice: Subject to any disclaimer, the term of this patent is extended or adjusted under 35 U.S.C. 154(b) by 0 days.

(21) Appl. No.: 09/505,438

(22) Filed: Feb. 16, 2000

Related U.S. Application Data

(60) Provisional application No. 60/132,390, filed on May 4, 1999.

(51) Int. Cl.[7] .................................................. G08B 21/00
(52) U.S. Cl. .......................... 340/606; 340/610; 116/273; 137/554; 200/293
(58) Field of Search ..................... 340/606, 610, 340/611; 116/273, 274, 275; 73/861.74, 861.76; 137/554, 555, 553; 200/293, 573; 439/367, 345; 169/23

(56) References Cited

U.S. PATENT DOCUMENTS

| | | | |
|---|---|---|---|
| 2,966,133 | * 12/1960 | Hube | 340/606 |
| 4,454,768 | * 6/1984 | Nansel | 73/861.76 |
| 4,782,333 | 11/1988 | Merchant . | |
| 4,791,414 | 12/1988 | Griess . | |
| 4,958,144 | 9/1990 | Griess . | |
| 5,213,205 | * 5/1993 | Laubach et al. | 200/293 |

* cited by examiner

Primary Examiner—Jeffery Hofsass
Assistant Examiner—Anh La
(74) Attorney, Agent, or Firm—Rockey, Milnamow & Katz

(57) ABSTRACT

A paddle type flow detector for an explosive environment is mountable onto a pipe. The detector includes a structure for mounting to a pipe, a substantially sealed switch housing containing an electrical switch, and a paddle located within the pipe. A lever mechanism connects to the paddle and extends up through the mounting structure and to the switch housing. A spring is contained between the switch housing and the mounting structure and is connected between the lever mechanism and a screw adjustable spring block. The spring is contained within a spring compartment formed between the switch conduit and the mounting structure. A slide rod is operatively connected to the lever mechanism and to the switch to change a state of the switch upon sliding movement of the slide rod. The slide rod is tightly fit within a bore of the switch housing and blocks a flame path between the switch housing and the spring compartment. By isolating the spring compartment from the switch housing, explosions within the switch housing are prevented from propagating to the spring, such explosions otherwise causing a change in the spring characteristics and bias force of the paddle of the detector.

14 Claims, 2 Drawing Sheets

EXPLOSION PROOF WATER FLOW DETECTOR

The present non-provisional application claims the benefit of provisional application U.S. Ser. No. 60/132,390 filed May 4, 1999.

TECHNICAL FIELD OF THE INVENTION

The present invention relates to flow detectors. Particularly, the invention relates to a water flow detector for use in an explosive environment.

BACKGROUND OF THE INVENTION

A paddle type flow detector utilizes a paddle which is inserted into a flow conduit, such as into a pipe. Paddle type flow detectors are designed, for example, to be mounted on a water pipe of sprinkler-type fire suppressant systems to activate an alarm when water flows in the pipe.

A paddle type flow detector is disclosed, for example, in U.S. Pat. Nos. 4,782,333 and 4,791,414, both assigned to the assignee hereof, herein incorporated by reference.

The known paddle type flow detector includes a switch mounted externally of the flow conduit and mechanically connected to the paddle. Movement of the paddle by force from a fluid flowing within the conduit causes a change in the state of the switch, generating a signal. The paddle is typically biased by a paddle spring into a base position corresponding to no flow in the conduit, and is movable against the spring bias into a "triggered" or "tripped" position by the flowing fluid.

Paddle type flow detectors have been used before within explosive environments, i.e., environments where explosive gases are likely to be present surrounding the detector. The Standard "UL 1203" sets forth criteria for explosion proof and dust-ignition-proof electrical equipment. In such equipment, sparks from opening and closing a flow indicating switch are isolated from the external environment by an enclosure or housing surrounding the switch and the housing prevents such sparks from propagating a flame or explosion outside of the housing.

However, it is possible that the switch enclosure or housing, over time, will permit the intrusion of explosive gases into the enclosure, particularly when the detector is located within an explosive environment for an extended period of time. It is possible then, that explosive gas and oxygen within the paddle switch housing can be ignited by the opening and closing of the switch contained therein. Such explosions can affect the sensitivity of the paddle spring which biases the paddle against the flowing fluid.

In the case of the paddle type detector used as a waterflow detector in a sprinkler system, the switch can be triggered more frequently than normally would be expected due to an activation of the fire suppressant system. Transient flows can occur in the sprinkler system pipes. For example, when a pump that maintains pressure in the system turns on, air trapped in the system will be compressed, which may cause water to temporarily surge past the flow detector location. Such temporary surges can trigger false alarms which are a nuisance. The common way to avoid such nuisance alarm is to provide a time delay between the beginning of the flow and in signaling an alarm. Not withstanding this time delay provision, the switch can be activated, i.e., change state between open and closed, many times more than actually needed to indicate a legitimate alarm. This would multiply the problem of spring exposure to explosions and the resultant effect on the sensitivity of the spring.

It would be desirable to provide a paddle-type flow detector which maintains its opening accuracy despite the possibility of explosions occurring within the switch housing of the detector.

SUMMARY OF THE INVENTION

The present invention provides a flow detector which includes a paddle arranged to be impacted by flow of a monitored fluid. A spring biases the paddle against movement caused by the monitored fluid. An electrical switch is caused to change state, either open or closed, by movement of the paddle. The electrical switch is contained within a switch housing, and the spring is contained within a spring compartment.

The spring compartment is isolated from the switch housing. Given intrusion of explosive gas into the switch housing, any explosions occurring within the switch housing will be effectively prevented from influencing or damaging the spring.

The switch housing is mounted over the spring compartment, and onto a flow conduit mounting structure. In the preferred embodiment, the mounting structure is a pipe saddle having a bolt mechanism for allowing the saddle to be clamped tightly around a pipe. A seal is provided within the mounting structure to seal a penetration of the paddle into the flow conduit or pipe.

According to the preferred embodiment, the paddle is connected to a paddle lever which extends through the mounting structure and into the spring compartment. The spring exerts a force on the lever to bias the paddle into a "no flow" or base position, biased to oppose paddle movement caused by fluid flow. The paddle is pivotally mounted by a flexible connection to the mounting structure.

The paddle lever is connected to a slide rod which is in turn connected to a movable switch lever. The slide rod extends through a wall which separates the spring compartment from the switch housing.

The slide rod penetrates the wall in a substantially sealed fashion. The sealed penetration of the slide rod eliminates a flame path between the switch housing and the spring compartment.

The switch lever is operatively connected to the switch contained within the switch housing. The lever is movable to change the switch state in response to sliding movement of the slide rod. In operation, the switch lever is moved by the slide rod, when the slide rod is moved by pivoting of the paddle lever.

The flow detector of the present invention is resistant to spring damage due to intrusion of explosive gas into the switch housing. By isolating the switch housing from the spring compartment, any explosions occurring within the switch housing are effectively prevented from entering the spring compartment by the surrounding walls of the switch housing and the sealed fit of the slide rod. Improved reliability of the detector is achieved by eliminating the flame path between the switch and the spring.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
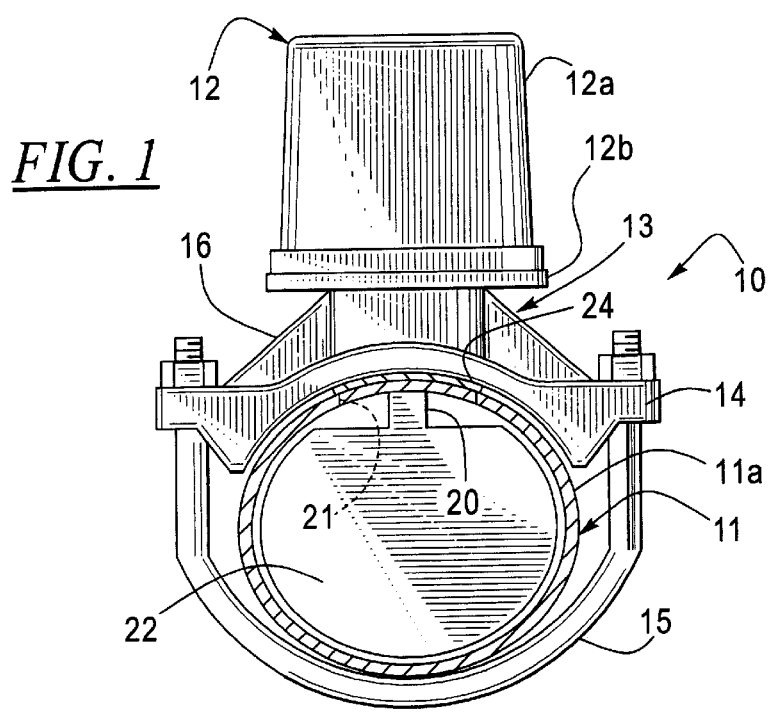
FIG. 1 is an elevational view of a flow detector of the present invention mounted onto a pipe (shown in section)

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

FIG. 1 illustrates a flow detector 10 mounted onto a fluid carrying conduit, such as a pipe 11 defined by an annular pipe wall 11a. The fluid carried within the conduit can be water or another fluid. The detector 10 includes a switch housing 12 mounted onto a mounting structure 13.

The mounting structure 13 includes a pipe saddle 14, a frame 16 and a U-bolt 15. Tightening of the U-bolt 15 clamps the pipe saddle 14 to the pipe 11.

The switch housing 12 includes a concave cover 12a fastened onto a base plate 12b. A lever 20 extends through a hole 21 in the pipe wall 11a and is connected to a paddle 22 located within the pipe 11.

Figure 2:
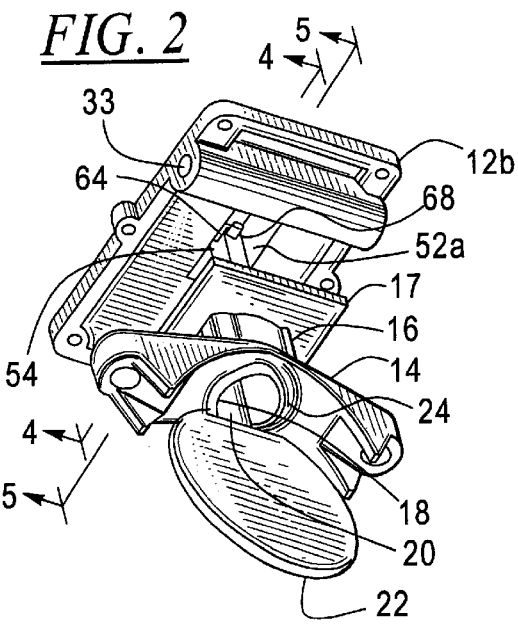
FIG. 2 is a bottom perspective view of portion of the detector shown in FIG. 1.
Figure 3:
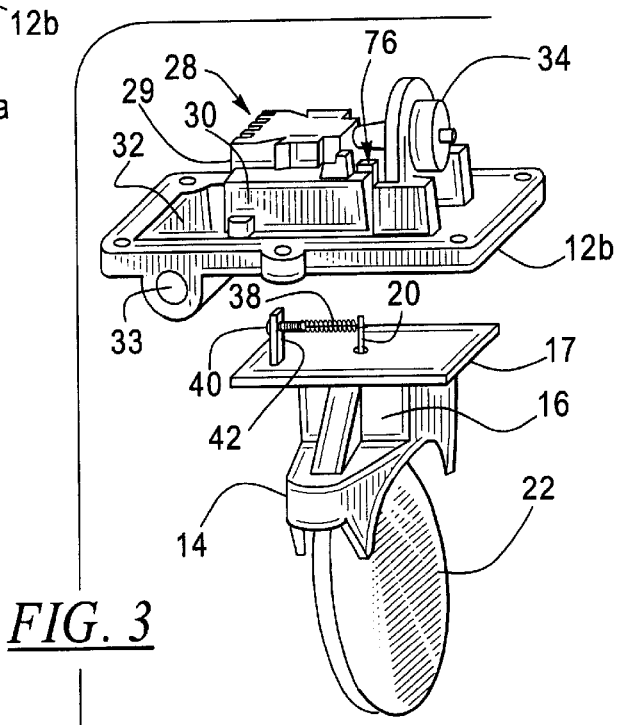
FIG. 3 is an exploded perspective view of the detector shown in FIG. 2.

FIGS. 2 and 3 illustrate the detector 10 separate from the pipe 11 and with the cover 12a removed for clarity of description.

FIG. 2 illustrates the saddle 14 connected to the frame 16 which supports a rectangular mounting plate 17. The saddle 14 has a central bore 18. The lever 20 penetrates through the bore 18 and is connected to a paddle 22 arranged below the frame 16. The paddle 22 is placed within the conduit, for example, within the pipe 11. Any flow of fluid within the conduit exerts a force on the paddle 22.

FIG. 2 also illustrates the saddle 14 carrying an annular seal 24 which surrounds the vertical bore 18. When the saddle 14 is tightly clamped to the pipe 11 by the U-bolt 15, the seal 24 seals around the opening 21 (shown in FIG. 1) through the pipe which receives the lever 20.

FIG. 3 illustrates the base plate 12b overlying the mounting plate 17. The base plate 12b is fastened to the mounting plate 17 by screws (not shown).

A switch assembly 28 is carried by the base plate 12b. The switch assembly 28 can be configured as set forth in U.S. Pat. No. 4,782,333 or 4,791,414, as herein incorporated by reference. In the illustrated embodiment, the assembly 28 includes wire terminals 29, a slidably moveable assembly 31, and one or more switch contacts (not shown). The slidably moveable assembly 31 slides to change the state of one or more switch contacts. The switch assembly 28 is elevated on a platform 30 of the base plate 12b. The slidably moveable assembly 31 of the switch assembly 28 is connected to a diaphragm type air chamber 34 of a timer assembly as described in U.S. Pat. No. 4,782,333. It is important to note that the switch assembly can be of various types and configurations which utilize a mechanically induced movement to change states of the switch contact, without departing from the scope of the invention.

The base plate 12b includes a downwardly indented trough area 32 which is open into conduit ports 33 and 33'.

Wires, carried by a conduit (not shown) connected to the conduit port 33, pass through the port 33, through the trough 32 and are connected to the switch 28.

The lever 20 penetrates through the saddle 14, through the frame 16 and the mounting plate 17, and extends above the mounting plate 17. Above the mounting plate 17, a coil spring 38 is connected at one end to the lever 20 and at an opposite end to a screw adjustor 40.

The screw adjustor is axially positionable toward or away from the lever by being threadedly engaged within a stationary block 42. The stationary block 42 is fixed to, and extends above, the mounting plate 17.

Figure 4:
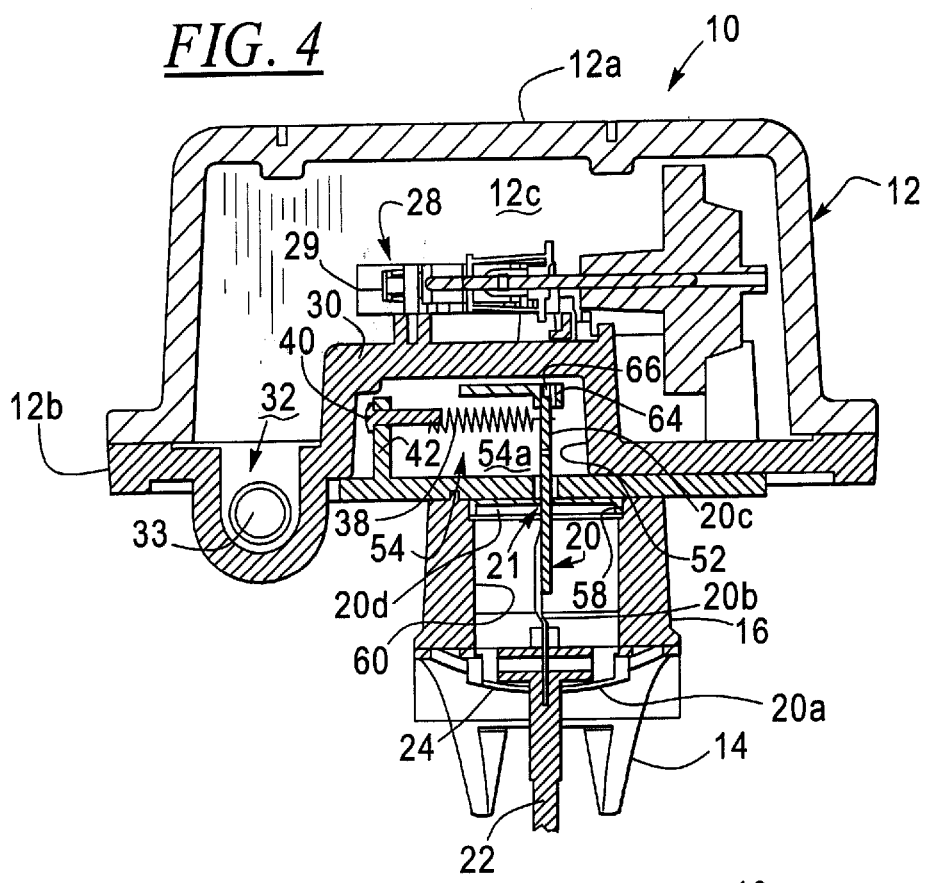
FIG. 4 is a fragmentary, sectional view taken generally along line 4—4 of FIG. 2.

FIG. 4 illustrates the cover 12a mounted to the base plate 12b forming the switch housing 12. The housing 12 forms an interior volume 12c. The switch assembly 28 is located within the volume 12c.

Figure 5:
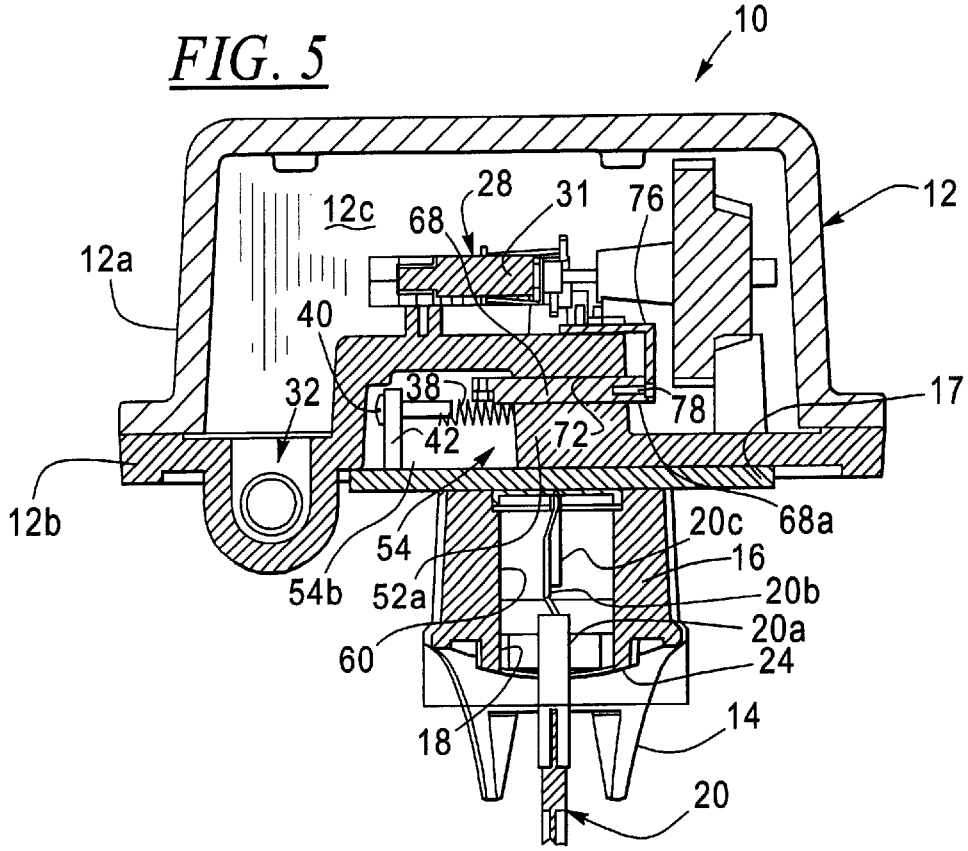
FIG. 5 is a fragmentary, sectional view taken generally along 5—5 of FIG. 2.

The platform 30 is formed by a raise indentation 52 of the base plate 12b toward the cover 12a. The raised indentation 52 partly defines a spring compartment 54 outside of the interior volume 12c. The spring compartment 54 is formed between the indentation 52 and the mounting plate 17. The spring compartment 54 is substantially L-shaped (in plan) having a long compartment section 54a and a short compartment section 54b (FIG. 5).

The paddle 22 is connected to a first lever portion 20a. The first lever portion 20a is connected to a second lever portion 20b. The second lever portion 20b is connected to a third lever portion 20c which is connected to, or formed with, a flexible disc portion 20d. The lever portion 20c is preferably insert molded with the flexible disc portion 20d which can be a rubber seal member.

The frame 16 has a central bore 60, aligned with, and open to, the central bore 18 of the saddle 14. The central bore 60 forms a stepped recess 58 at a top end of the frame 16. The disc portion 20d is captured in the stepped recess 58 by the overlying mounting plate 17.

The third lever portion 20c is connected to a slide lever 64 at a socket portion 66 thereof. The slide lever 64 is formed with, or connected to, a slide rod 68 (shown in FIG. 5), for conjoint sliding therewith. The socket portion 66 is sufficiently oversized to allow for pivoting movement of the third lever portion 20c to drive the slide lever 64 with a sliding movement.

Pivoting motion of the paddle 22 in the direction B1 will pivot the lever 20 about the point 21 at the flexible disc portion 20d, opposing the force exerted by the spring 38. The slide lever 64 will be translated to the right in FIG. 4. The screw adjustor 40 can be axially positioned with respect to the block 42 to increase or decrease the tension in the spring 38 to oppose pivoting of the lever 20 with an adjustable force.

FIG. 5 illustrates the slide rod 68 which closely fits into a bore 72 through a wall 52a of the indentation 52 of the base plate 12b. The slide rod 68 extends into the switch housing 12 at a distal end 68a.

An L-shaped switch lever 76 is connected by a fastener 78 to the slide rod distal end 68a. An opposite end of the L-shaped switch lever 76 is operatively connected to the slidably moveable assembly 31 such that sufficient, preselected sliding movement of the slide rod 68 and the switch lever 76, in one of two opposite directions, will respectively change the state of the switch assembly 28, contacts thereof being opened or closed.

The switch housing 12 is considered an "explosion proof" enclosure. The enclosure can be designed in accordance with the Standard, UL 1203 "Explosion Proof And Dust-Ignition-Proof Electrical Equipment For Use In Hazardous Locations." Although being explosion proof with respect to explosions occurring outside of the switch housing, the switch assembly 28 can at times create explosions within the housing 12 due to emanating sparks and the like from the switch assembly contacts as the detector senses flow or the cessation of flow.

By locating the spring 38 outside of the interior 12c of the explosion-proof housing 12, the spring is shielded from explosions within the housing 12. This protection from explosions prevents any damage to the spring or alterations to the spring's characteristics. These would in turn alter spring sensitivity which might affect the operation of the water flow detector.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A detector, comprising:
    a structure for mounting to a flow conduit;
    a switch housing mounted to said structure;
    a switch having alternate opened and closed states, wherein said switch is contained within said switch housing;
    a lever mechanism operatively connected to said switch and movable to change states of said switch, said lever mechanism having a switch activating portion extending through a wall of said switch housing and connected to said switch, said lever mechanism having a pivot part operatively connected to said switch activating portion which is pivotable upon detection of a condition within the flow conduit;
    a spring operatively connected to said pivot part at one end of the spring and operatively connected to said structure at an opposite end of the spring to bias said pivot part into a base position and wherein said switch housing is substantially sealed to be explosion-proof, said spring located outside of said switch housing.

2. The detector according to claim 1, wherein said spring is contained in a spring compartment, located between said structure and said switch housing.

3. The detector according to claim 1, comprising a paddle connected to said pivot part of said lever mechanism, said paddle being arranged to be acted upon by fluid within the flow conduit, and said condition within said flow conduit is a flow of fluid within the flow conduit.

4. The detector according to claim 3, wherein said pivot part of said lever mechanism comprises a first lever portion connected to said paddle, a second lever portion extending from said first lever portion, and a flexible member, said second lever portion connected to said flexible member, said flexible member fixed to said structure but allowing pivoting of said second lever portion, and wherein said switch activating portion comprises a slide lever portion, connected to said second lever portion, and to said switch, said slide lever portion penetrating said wall of said switch housing in substantially sealed fashion.

5. A detector, comprising:
    a structure for mounting to a flow conduit;
    a switch housing mounted to said structure;
    a switch having alternate opened and closed states, wherein said switch is contained within said switch housing;
    a lever mechanism operatively connected to said switch and movable to change states of said switch, said lever mechanism having a switch activating portion extending through a wall of said switch housing and connected to said switch, said lever mechanism having a pivot part operatively connected to said switch activating portion which is pivotable upon detection of a condition within the flow conduit;
    a spring operatively connected to said pivot part at one end of the spring and operatively connected to said structure at an opposite end of the spring to bias said pivot part into a base position and wherein said switch housing is isolated from said spring;
    a paddle connected to said pivot part of said lever mechanism, said paddle being arranged to be acted upon by fluid within the flow conduit, and said condition within said flow conduit is a flow of fluid within the flow conduit; and
    wherein said pivot part of said lever mechanism comprises a first lever portion connected to said paddle, a second lever portion extending from said first lever portion, and a flexible member, said second lever portion connected to said flexible member, said flexible member fixed to said structure but allowing pivoting of said second lever portion, and wherein said switch activating portion comprises a slide lever portion, connected to said second lever portion, and to said switch, said slide lever portion penetrating said wall of said switch housing in substantially sealed fashion.

6. The detector according to claim 1, wherein said structure comprises an upper saddle part and a lower saddle part and one or more bolts which connect the upper and lower saddle parts together on opposite sides of a pipe, to clamp said structure to a pipe.

7. The detector according to claim 6, wherein said spring is located within a spring compartment formed between said structure and said switch housing.

8. The detector according to claim 3, wherein said structure includes a mounting plate, and said lever mechanism extends from said paddle through said mounting plate, said mounting plate includes a block connected to said opposite end of said spring.

9. The detector according to claim 8, comprising a screw adjustor threaded into said block and connected at an end thereof to said opposite end of said spring, said screw adjustor being advanceable through said block to adjusted tension of said spring.

10. The detector according to claim 9, wherein said structure and said switch housing form therebetween a spring compartment, and said spring is contained within said spring compartment, said spring compartment being substantially closed.

11. The detector according to claim 9, wherein said structure comprises a two piece clamp, arranged for receiving the pipe between said two pieces, and one of said pieces including a seal for sealing the opening in the pipe which receives the lever.

12. A paddle-type flow detector for use in explosive environments, comprising:
    a structure mountable to a pipe over an opening in the pipe;
    a paddle extendable within the pipe and movable by influence of flowing fluid within the pipe;
    a lever connected to the paddle and extending through the opening of the pipe;
    a substantially sealed switch housing carried by said structure;

an electrical switch contained within said switch housing, said switch having at least an open state and a closed state;

a spring connected to said lever at one end and operatively connected to said structure at a respective opposite end to bias said lever into a base position, wherein said spring is located outside of said substantially sealed switch housing; and a slide rod guided for sliding movement through a bore in a wall of said substantially sealed switch housing, said slide rod operatively connected to said lever to slide within said switch housing upon pivoting of said lever, said slide rod operatively connected to said switch to change the state of said switch.

13. A fluid flow detector comprising:

a housing;

a sensor of fluid flow wherein the sensor is supported by the housing for movement between a no flow indicating position and a flow indicating position;

a two state switch carried within a closed region of the housing;

a linkage extending between the sensor and the switch to cause the switch to go from a first state to a second state in response to movement of the sensor when the linkage extends, in part, through an explosion inhibiting seal whereby explosions caused by changed of state of the switch are confined within the region of the housing by the seal, said detector includes an element outside of the region for biasing the sensor to the no flow indicating position.

14. A detector as in claim 13 wherein the element is a metal spring.

* * * * *